United States Patent [19]

Kühlmann

[11] 4,331,103
[45] May 25, 1982

[54] NEST INSTALLATION FOR POULTRY FARMS

[76] Inventor: Josef Kühlmann, Konigstr. 41, D - 4401 Laer, Fed. Rep. of Germany

[21] Appl. No.: 234,947

[22] Filed: Feb. 17, 1981

[51] Int. Cl.³ .............................................. A01K 31/16
[52] U.S. Cl. ...................................................... 119/48
[58] Field of Search ...................... 119/48, 45; 198/735

[56] References Cited

FOREIGN PATENT DOCUMENTS 1159208 12/1963 Fed. Rep. of Germany ........ 119/48
1966385  1/1973 Fed. Rep. of Germany ........ 119/48
1966710 11/1973 Fed. Rep. of Germany ........ 119/48

Primary Examiner—Hugh R. Chamblee
Attorney, Agent, or Firm—Merchant, Gould, Smith, Edell, Welter & Schmidt

[57] ABSTRACT

The invention discloses cages for a multi-story battery/nest installation accommodating a large number of hens, without the accompanying disadvantages of previously known cage accommodations. Installed in the invention as a nesting space (3, 4, 5 and 6) and as a simultaneous egg transport contrivance (16) is a layer of chaff (S) extending from top to bottom.

8 Claims, 1 Drawing Figure

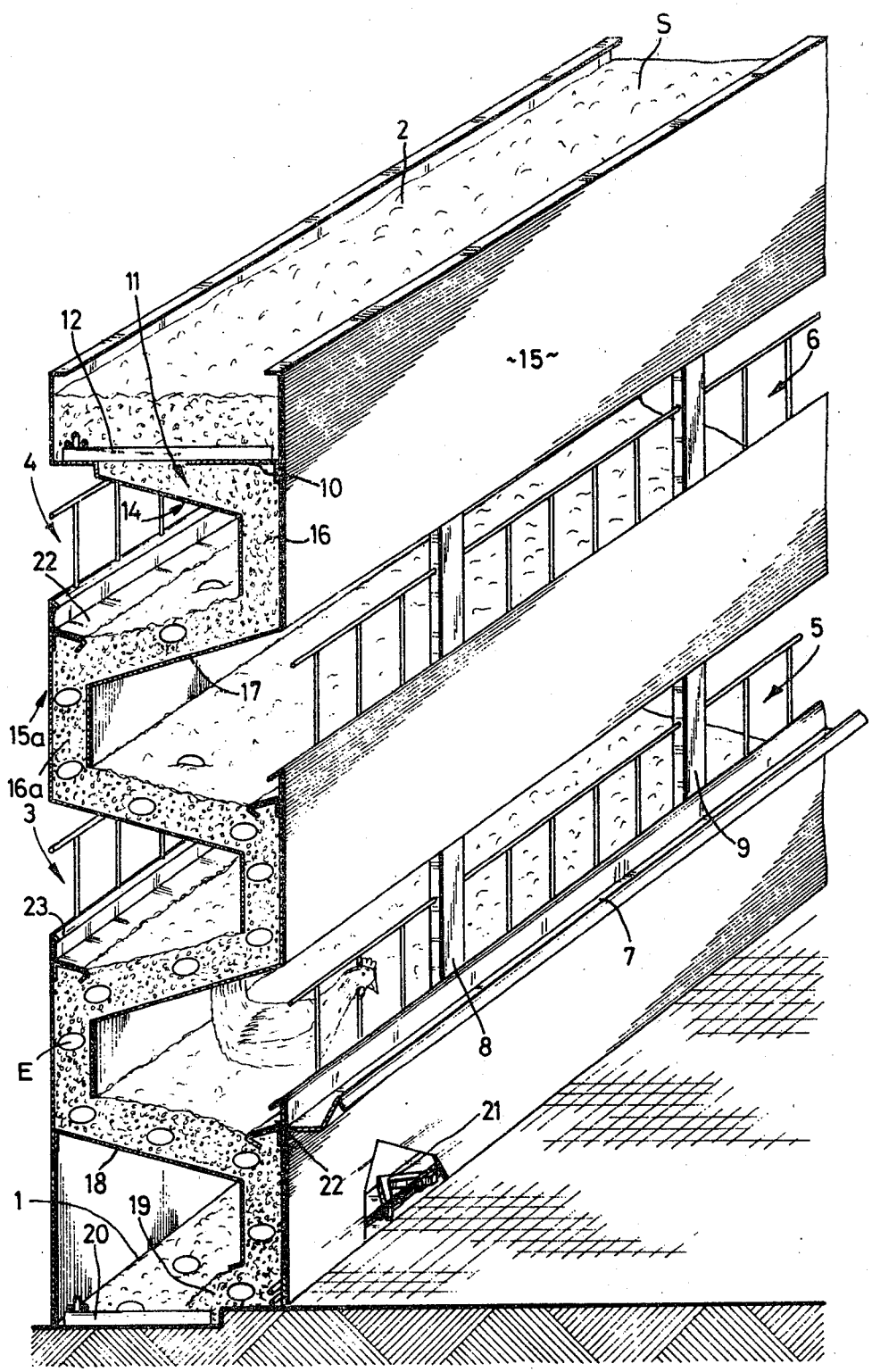

NEST INSTALLATION FOR POULTRY FARMS

TECHNICAL FIELD

The invention relates to nest installations for poultry farms and in particular to a nest installation having drop chutes for the eggs and chaff for retarding the free fall, along with feed and removal contrivances for the chaff above and below the drop chutes.

BACKGROUND OF THE INVENTION

So-called multistory battery/cage installations (e.g. DE-AS No. 19 66 385) normally consist, today, of narrow cages in which the animals stand up on a screen-like floor through which the dung can fall, but on which the eggs can roll off and, usually, be guided to an egg conveying contrivance arranged on the front side of the cages, while the dung is conveyed off via appropriate dung conveying contrivances. These types of cages do not correspond in the least to the usual environment of the animals, so that the laying performance of the animals is also impaired by this.

In the case of so-called nest installations, it has become known as in DE-PS No. 11 59 208 how to form the nests by means of containers whose floor sides are formed by a conveying means on which the chaff lies, so that the animals, when they are in these cages, sit on the chaff and, in this fashion, as in the case of natural support, scratch and can build their nest, thus sitting in the chaff warm and protected. Additionally, the chaff protects the eggs.

The task set forth for the invention is to obtain a nest installation displaying the advantages of the usual type of laying nests, as are for example described in DE-PS No. 11 59 208, but which, simultaneously enable a large accommodation of hens, as is made possible through means of the usual type, multistory battery/cage installations.

SUMMARY OF THE INVENTION

This task of combining the above advantages forms the basis of the invention as resolved by the features disclosed in the claims. Obtained in particular through the proposal of the invention is a multistory nest installation whereby the floor regions of these nests are formed by chaff, without necessitating the individual installation of a conveying mechanism for each individual story for conveying off this chaff. Rather, the floor of the nests, i.e., therefore the layer of chaff forming the floor, is obtained by the fact that the layer of chaff is guided downwardly from a top supply area, e.g. zig-zag fashion, via drop tubes and deflector walls, so that the layer of chaff arriving below is full of eggs. The eggs can then be transported off in continuous fashion without there occurring a disturbance of the actual nesting operation.

For clarification of the invention, this latter will be explained in the following with the aid of a schematic illustration.

BRIEF DESCRIPTION OF THE DRAWINGS

FIG. 1 is a perspective view of the present invention.

DETAILED DESCRIPTION OF THE INVENTION

Not shown in FIG. 1 are the additional, auxiliary means such as feeding arrangements, drinking water arrangements, roosting perches, heating contrivances, etc., required for normal operation, since these can be of the usual type. More to the point, the drawing in FIG. 1 is to clarify only the basic construction of the nest installation in accordance with the invention.

Illustrated in FIG. 1 is a four-story nest installation that is defined, going downwardly by an egg collecting trough 1 and, going upwardly by a supply trough 2, it being clear and self-understood that, instead of the four nest stories shown, several or even fewer nest stories can be provided.

The individual nest stories are designated in the drawing by the reference numerals 3 and 4, and 5 and 6, respectively. Here, the nests can be closed off toward the front by means of screens, illustrated in the drawing schematically, with animal-size openings through which the animals can reach the net arrangements on one side and come out of the nests to the feeding arrangements on the other side, indicated schematically at 7 for nest story 5, without requiring the animals to leave the nests. Designated at 8 and 9 are the support struts bearing the overall arrangement. The invention is not limited to this particular type of support-strut construction.

The floor of the supply trough 2 is formed by a floor plate 10 that displays a passthrough opening 11 over which a conveying means 12, e.g. a single-chain cross piece conveyor, can travel. Provided below this passthrough opening 11 and conveying means 12, respectively, is a guide wall 14 displaying a slope that is somewhat greater than the angle of inclination of the chaff to be conveyed. The chaff is designated generally in the drawing by the letter S. The guide wall 14 forms the ceiling surface of the nest 4 and, as such, ends on the inside at room interval from the outer wall 15 and then extends downwardly a distance, parallel to the wall 15 so that a drop chute 16 is formed.

Located at distance below the free end of the guide wall 14 is a further guide wall 17 that adjoins the inner side of the outer wall 15 and extends to the oppositely lying outer wall 15a, a determined length, to define the floor surface and then extending downwardly parallel to this outer wall 15a, so that a further drop chute 16a is formed. Nests 3 and 5 are formed in the same manner by appropriate guide walls.

The eggs contained in the chaff are designated by the letter E. It can now be understood that formed, as discussed above, is a layer of chaff extending from the top to the bottom of the installation that ends in the egg collecting trough 1. The layer of chaff becomes capable of flowing when it is drawn away in the region of egg collecting trough 1.

Here, the last guide wall 18 is embodied, i.e. ends at some distance away from the egg collecting trough, such that an outflow opening 19 is obtained, where the layer of chaff is stowed as a function of the natural angle of inclination of the chaff S. The selected angle of inclination prevents any self-actuated outflow of the layer of chaff as it extends from top to bottom. It is only by driving the conveying means 20, located in the egg collecting trough 1, e.g. also a single-chain cross piece conveyor, that this angle of inclination can be altered and thereby create an outflow of the layer of chaff.

It is understood that drawing off of the lower layer of chaff is accomplished such that care is always taken to have a sufficient quantity of chaff inside the drop chutes. It is also completely possible to structure the lower outflow opening of the lowermost drop chute to be closable so that the chaff does not move into the drop chute and the egg collecting trough 1 then conveys only eggs.

Additional conveying means 21 can further support discharge of the layer of chaff, whereby, with a coordination of the revolving speed of the conveying means 20 and of the conveying means 21, it can be assured that the layer of chaff flows out only very slowly so that the animals sitting on this layer of chaff notice withdrawal of the layer of chaff scarcely at all and, above all, are not disturbed by removal of the layer of chaff.

Arranged below the edges of the walls defining the forward openings of the nests and inside the nests formed, as for example the outer wall 15 or 15a, are deflector shields 22 that prevent an outflow of the chaff through the openings. Additionally, the front edges in the region of the openings are capable of being bent inwardly to form deflector edges 23.

It is completely within the scope of the invention that, in addition to the floor plates that are formed by the guide walls 14 etc., safety contrivances forming the plate can be arranged inside the chaff so that passages are not too large and falling through of the hens is prevented. Such floors can be formed by the usual wire-type nest floors.

The separation of the nests, as seen in the longitudinal direction of the nests, can be accomplished by means of full-walled or screen-like partitions that are known in the art, and not illustrated in the drawing for reasons of clarity.

The method of operation of the arrangement in accordance with the invention is such that, by pulling the chaff mixed with eggs and dung in the egg collecting trough 1, there is achieved a slow flow of the layer of chaff through the drop chutes 16. Simultaneously, for a sufficient feed, care must be taken to have additional and new chaff in the top supply trough 2.

The chaff mixed with eggs and dung is fed to a collecting point where the eggs can be separated from the chaff, with the chaff capable of being treated, e.g. disinfected, and replenished. Simultaneously, using appropriate blowers or sieve arrangements, the dung-laden chaff portions can be removed and carried off.

What is claimed is:

1. A nest installation for poultry comprising:
   at least two interconnected nest stories constructed and arranged in a stacked relationship to each other including a topmost and a bottommost story, each of said stories having a floor, a ceiling, and at least one closed side, said side having an inner wall and an outer wall;
   at least two guide walls, each of said guide walls defining a ceiling and an inner wall of a first nest story, and a floor and an outer wall of a second nest story, said second nest story being positioned above said first nest story;
   a layer of chaff extending from said topmost nest story to said bottommost nest story along and between said inner and outer walls of each story therebetween and extending along said floor of each of said nest stories;
   a supply trough positioned proximate said topmost nest story, said supply trough containing an amount of chaff sufficient to substantially fill said layer extending through said nest stories and including first conveying means for moving said chaff through said trough; and
   an egg collecting trough positioned proximate said floor of said bottommost nest story, said collecting trough including second means for conveying eggs from said nest installation.

2. The nest installation according to claim 1, wherein each of said guide walls includes:
   a central portion having a first edge end and a second edge end, said central portion being positioned at a slope exceeding the natural angle of inclination of the chaff being conveyed, said central portion defining the floor of one nest story and the ceiling of said nest story immediately below said story;
   a first portion extending generally downwardly from said first edge end and parallel to said outer wall of one of said nest stories forming the inner wall of said nest story, said first portion and said outer wall defining a drop chute therebetween for conveying said layer of chaff;
   a second portion extending generally upwardly from said second edge and defining said outer wall of said nest story positioned immediately above said central portion,
   with adjacent first and second guide wall portions forming therebetween a drop chute whereby eggs and chaff may be conveyed from said topmost nest story to said bottommost nest story.

3. The nest installation according to claim 1 wherein said first and second conveying means are each constructed and arranged to cooperate simultaneously to move said chaff and eggs along and through each of said nest stories.

4. The nest installation according to claim 1, wherein each of said nest stories further includes an open side opposite said closed side and a deflecting shield means, said means being positioned between said open side and said layer of chaff for preventing outflow of said layer of chaff from said open side of said story.

5. The nest installation according to claim 4, wherein each of said nest story deflecting shield means includes a rim edge bent inwardly from said open side to form a deflector edge.

6. A poultry nest installation having a stacked arrangement of at least two nest stories, said installation comprising:
   a first nest story and a second nest story, each of said nest stories including an open side, a closed side including an inner wall and an outer wall, a ceiling and a floor;
   means for interconnecting said nest stories including a common guide wall intermediate said first and second nest stories defining said respective first story floor and said second story ceiling, said guide wall having a central portion, a first end portion and an opposing second end portion, said first end portion extending upwardly to define said outer wall of said first story and said second end portion extending downwardly to define said inner wall of said second nest story;
   a chaff supply trough positioned above said nest stories, said trough including a portion having an opening therein;
   a collecting trough positioned below said nest stories, said trough including means for drawing eggs and chaff through said trough; and
   a layer of chaff disposed in each of said troughs and extending along said interconnecting means;

said inner and outer walls of each nest story being spaced apart to define a drop chute for chaff and eggs therebetween, said central portion being positioned to slope in a generally downward direction at an angle greater than the natural angle of inclination of the chaff contained in said layer, said interconnecting means further including an uppermost guide wall connected to said supply trough, said uppermost guide wall having a portion sloping generally downwardly at an angle greater than the natural angle of inclination of the chaff in said layer, and a portion extending downwardly to define said inner wall of said first nest story said trough opening arranged to allow chaff to pass therethrough to said uppermost guide wall, down said drop chute of said first nest story, continuing along said interconnecting means to said collecting trough.

7. The nest installation according to claim 6, wherein said supply trough includes means for conveying said layer of chaff into said interconnecting means, said conveying means cooperating with said drawing means of said collecting trough to move eggs and chaff from said nest stories.

8. The nest installation according to claim 6, wherein each of said nest story open sides includes a portion having deflecting means for preventing flow of said chaff out said open side, said means including a rim edge member bent inwardly towards said respective closed side to form a deflecting edge for containing said chaff layer between said sides of said respective story.

* * * * *

UNITED STATES PATENT AND TRADEMARK OFFICE
CERTIFICATE OF CORRECTION

PATENT NO. : 4,331,103
DATED : May 25, 1982
INVENTOR(S) : Josef Kuhlmann

It is certified that error appears in the above—identified patent and that said Letters Patent is hereby corrected as shown below:

Column 2, line 35, "room" should be --some--;

Column 2, line 38, "at" should be --a--.

*Signed and Sealed this*

*Thirty-first* Day of *August 1982*

[SEAL]

*Attest:*

GERALD J. MOSSINGHOFF

*Attesting Officer*     *Commissioner of Patents and Trademarks*